TAPE TRANSPORT

Filed Aug. 2, 1965

ROBERT A. KLEIST,
INVENTOR

BY Leon D. Rosen
Albert Rosen
ATTORNEYS 3,458,154

TAPE TRANSPORT

Robert A. Kleist, Anaheim, Calif., assignor to Dartex, Inc., Anaheim, Calif.

Filed Aug. 2, 1965, Ser. No. 476,286
Int. Cl. G11b *15/44*
U.S. Cl. 242—182 3 Claims

ABSTRACT OF THE DISCLOSURE

A high performance tape transport wherein the tape is constantly held against the capstan by a pressure roller and tape is moved in a closely controlled manner by controlled rapid acceleration and deceleration of the capstan which is directly coupled to the low inertia armature of the capstan drive motor.

This invention relates to transports for tape and other elongated materials commonly referred to as web materials, and, while not limited thereby, is directed to magnetic tape transports for digital data applications which are required to provide precisely controlled intermittant and bidirectional tape movement.

Modern magnetic tape transports, such as those used in connection with digital computers, often require mechanisms for accelerating the tape bidirectionally at high accelerative levels. When tape is used to store information for a digital computer, bursts of data may be transferred to or from the magnetic tape at high speeds without advance, or warning, signals. Thus, little time is available for the tape transport to accelerate to full speed. Inasmuch as data transfer cannot normally occur until full tape speed is reached, it is important to accelerate the tape to full speed very rapidly. The acceleration capability of tape transports often limits the speed of operation of digital computers and other data handling systems, and a delay of even milliseconds can be very important.

There are other criteria for measuring tape transport performance besides acceleration capability. One important measure of performance is the maximum speed at which tape can be moved, especially during data transfer to or from the tape. This requirement is often independent of the acceleration capability. For example, in search operations where perhaps an entire reel of tape may have to be read to find a particular data record, considerable time may be saved if data can be read at very high speeds. Also, where advance warning can be provided to enable the tape to accelerate to high speeds before data transfer occurs, as where a delay line is used, high speed operation can be valuable regardless of acceleration capability. Of course, it may be especially valuable to provide both high acceleration and high speed capabilities in a tape transport system.

It may be noted that there are actually two modes of high speed operation, one involving data transfer as in the search operation, and the other involving no data transfer as in the rewind of tape on the supply reel. Both are important.

Previous transports have employed a variety of mechanisms for accomplishing high speed and/or high acceleration of tape with precise bidirectional control. One general type of mechanism employed a pair of contrarotating capstans, and pinch rollers for forcing the tape against either one of the two capstans to move the tape in either direction. The capstans were constantly rotating, whether the tape was moving or not. Such devices had many disadvantages, including complexity, limited high speed capability, and lack of predictable and reliable performance.

The ability of the pinch roller type of transport to rapidly accelerate or decelerate tape in a predictable fashion was partially limited by the delay in moving the pinch roller against the tape or removing it therefrom after a start or stop command was received. While this delay was of the order of magnitude of only milliseconds, such a delay is significant in digital computer applications. The acceleration capability was also limited by slippage of tape on the capstan, especially when oxide material had accumulated on the contacting elements.

The ability of the pinch roller type of transport to operate at very high speeds was limited by the fact that the acceleration of the tape, occurring when the pinch roller contacted the tape, could not be controlled. If it was desired to operate the transport at very high speeds (while data transfer occurred) regardless of how slow the acceleration might be, there was no practical way of doing so, since the rapidity with which a pinch roller grasps the tape cannot be easily varied to reduce acceleration. The maximum speed was further limited by the fact that the acceleration was not constant from zero to full speed, but was very high initially and decreased as full speed was approached. To prevent the tape from breaking by reason of the sudden application of high tension, the speed of the transport had to be low enough that the high initial acceleration would not damage the tape or introduce tape velocity transients that would prevent the accurate transfer of data for a period of time after acceleration to full speed. Inasmuch as the maximum acceleration varied due to accumulation of oxide material on contacting elements and misalignment of moving parts, the speed had to be further limited according to the initial acceleration under the worst (highest acceleration) conditions, even though such acceleration occurred only occasionally. In regard to high speed operation when no data transfer occurs, as during rewind, high speed could be achieved by not using capstan drive, but instead transferring tape directly between the reels; however, widely varying tension then occurs, resulting in nonuniform tape packing on the reel and the danger of damage to protruding tape edges.

The lack of predictable and reliable performance with pinch roller mechanism was partially due to the fact that the pinch roller was repeatedly slammed against the capstan, and the fact that the apparatus depended on the rapid and uniform establishment of friction contact between tape and capstan. The repeated blows of the rapidly moved pinch roller tended to misalign the transport and cause malfunction, and to set up shock waves which caused oscillations in tape speed. The rapid establishment of friction between tape and capstan is generally an unreliable phenomenon and even small variations in the alignment of parts or quality of tape surface result in large variations in acceleration and inaccurate tape guiding. If the pinch roller is slightly titled so that one edge initially presses the tape harder against the capstan than does the other edge, the tape will be initially skewed.

The lack of predictable acceleration characteristics for pinch roller transports also results in the waste of tape between groups of data bits, or records. A number of bits of data constituting a data record are often recorded at one time, the tape transport then being stopped until another record is to be recorded or read. Inasmuch as data transfer occurs only at full speed, the length of tape which is moved during deceleration to zero speed and subsequent acceleration to full speed represents an inter-record gap which results in unused tape. In the case of pinch roller transports, the length of the inter-record gap must be made large enough to accommodate the slowest acceleration due to slippage and other variations in performance, particularly in medium to high tape speed operation where the variations are greatest. This results in a lower density with which data may be recorded on a given length of tape, even though the bit per inch density remains the same.

An improved tape transport, described in Patent No. 3,185,364 by Robert A. Kleist, the present inventor, employs a tape drive wherein tape is wrapped about a capstan, and the capstan is directly coupled to a reversible drive motor to move the tape bidirectionally at high accelerative levels. Transfer of motion depends entirely upon friction between capstan and tape due to large wrap. The tape is in constant frictional contact with the capstan nad no pinch roller is used. In order to provide high friction between the capstan and tape, the tape path is arranged to provide for a large angle of wrap, such as 200°, about the capstan. Additionally, a definite minimum tension, such as 3 ounces, must be maintained in the tape path to provide the necessary frictional contact between tape and capstan.

The foregoing direct-drive, wrapped-capstan transport cannot drive the tape when large tape tension differentials exist, and therefore the tape tensions on opposite sides of the capstan must be well balanced. Large tension differentials result in slippage of tape over the capstan, even for large wrap angles. The wrapped-capstan transport typically employs vacuum chamber buffers between the reels and capstan, the chambers being pneumatically close coupled to provide constant and well balanced tension. When a start command is received, the capstan rapidly accelerates while the supply and take-up reels move slowly or not at all, and tape is withdrawn from one vacuum chamber buffer and stored in the other chamber buffer. When the loop of tape stored in one chamber shortens to a predetermined length, the bottom of the loop passes a position sensor which causes energization of the reel motor to unwind the reel and supply additional tape to the vacuum chamber buffer.

The foregoing wrapped-capstan transport with vacuum chamber buffers enables precise control of tape at high accelerative levels, but has many limitations. One limitation is in the speed at which the transport can be operated without complex reel motor control. Usually, the reel motor is operated by position sensors in the vacuum chamber buffers. The reel motor is off when the stored loop is in between the sensing points, and is turned on in the appropriate direction when the loop has moved past a sensing point. The reel motor accelerates from zero speed when the stored loop of tape passes the sensing point. In high speed operation the loop moves very rapidly past the sensing point, and in order to accommodate the loop of tape while the reel is accelerating, the vacuum chamber must be very long. Thus, in the International Business Machines transport Model 729, which operates at 112 inches per second, the vacuum chamber buffer is about four feet long. To enable rewind at the high rewind speed of approximately 300 i.p.s. used for that transport, rewind must be done from reel to reel because extremely long vacuum chambers would otherwise have to be used. Reel motor control systems are available which sense the difference in tape speed at the capstan and at the reel, in addition to tape loop position in the buffer, and energize the reel motor as soon as tape withdrawal is begun. Such reel control systems enable very high speed operation without excessively long buffer storage; however, such systems are complex and expensive.

The requirement of constant and well balanced tension for wrapped-capstan transports prevents the use of low cost buffers. Vacuum chamber buffer storage is relatively complex and expensive even where only position sensing reel servo control is involved. Thus, wrapped-capstan drives cannot be readily used in many lower cost applications, where the tape transport designs involve inherently unbalanced tension; for example, where there is no buffer between the tape reels, or where mechanical storage arms with nonconstant tension are employed.

Another disadvantage inherent in wrapped-capstan transports is that the path of the tape is not straight, since the tape must be guided about several sharp changes of direction to provide a large wrap about the capstan. A simple, essentially straight path would be more desirable to prevent mistakes and confusion and to allow more rapid tape loading, especially in the case of low cost transports which are typically operated by persons of low skill. A simple path would also be advantageous in enabling the construction of transports which are more compact and economical than heretofore.

Still another limitation of wrapped-capstan drives is their inability to accurately maintain tape position when power is turned off. When the system is deenergized, the tension used to hold the tape to the capstan is removed, and even very slight tension unbalance causes tape slippage. In many lower cost systems it is desirable to deenergize the system during long periods when no data transfer occurs, to save on power costs.

Accordingly, one object of the present invention is to provide a transport which incorporates most of the advantages of closely controlled direct capstan drive without most of the disadvantages arising from dependence on large tape wrap about the capstan to transmit driving force to the tape.

Another object is to provide a drive assembly for efficient tape movement in tape transports of relative simplicity and low cost.

Another object is to provide a relatively simple tape transport which is capable of very high accelerative levels.

Another object is to provide a relatively simple tape transport which is capable of very high speed, closely controlled tape movement.

Another object is to provide a tape transport with direct capstan drive, which is characterized by a simple tape path.

Another object is to provide a tape transport with direct capstan drive, which can operate with a tape path of unbalanced tension.

Another object is to provide a tape transport system with direct capstan drive, which maintains tape position during periods when the system is unenergized.

Another object is to provide a relatively simple tape transport wherein the supply and take-up reels are accelerated immediately after commencement of tape movement by the capstan.

Another object is to provide a buffer assembly for a tape transport, which accelerates a supply or take-up reel automatically as tape is withdrawn from the buffer.

Another object is to provide a buffer assembly for a tape transport, wherein the quantity of tape stored is independent of slow variations in reel motor torque and other system characteristics.

The foregoing and other objects of the present invention are realized by a tape transport wherein the tape is held in constant engagement with the capstan by a freely rotating pressure roller or the like. The capstan is of the direct-drive type, whereby tape movement is controlled entirely by energizing the motor or other driving means connected to the capstan rather than by controlling the engagement of tape and capstan. In one embodiment of the invention a capstan of steel or other metal is employed in conjunction with a pressure roller of rubber or other elastic material. The tape path has a configuration which provides for a slight tape wrap about the capstan, thereby providing for accurate tape guidance and reduction of skew, inasmuch as the steel capstan surface can be maintained accurately cylindrical. The roller presses the tape against the capstan to provide friction for enabling the capstan to drive the tape. In pressing against the tape and capstan, the roller surface deforms, and the deformation force acts as a brake to prevent creep of the capstan when the capstan is not driven and when all power is off. (The braking of the roller is in addition to braking due to brush friction of the capstan motor and tachometer.) The braking ability of the deformed pressure roller prevents creep and loss of position where unbalanced tension is present as is the case in many lower cost transports.

In another embodiment of the invention, the pressure roller has a metal surface, the capstan has a resilient surface, and the tape path is arranged to provide for slight tape wrap about the pressure roller. In still another embodiment, useful in enabling very simple transport design, the tape is not wrapped about either the capstan or the pressure roller, and a true straight line tape path results.

The pressure roller, which causes engagement of tape and capstan, can be spring biased with sufficient force that tape slippage does not occur even with appreciable unbalance in tape tension on either side of the capstan. As a result, the tape transport can operate without buffers between the capstan and the reels, or with any of a variety of buffers which supply nonuniform tension. One type of buffer which is especially useful employs an arm with a tape guide about which the tape path extends. When the capstan begins to move tape from the supply reel to the take-up reel, the buffer arm moves toward the capstan to supply a length of tape before the supply reel can rotate rapidly enough. In moving toward the capstan, the buffer arm increases the tension on the tape and thus, helps to rotate the supply reel. At the same time, another buffer arm, located between the take-up reel and the capstan, moves away from the capstan to store tape, and in so doing supplies a decreasing tape tension to enable the take-up reel to accelerate faster, and to begin accelerating sooner.

Another type of buffer which provides the advantages of a buffer arm in immediately accelerating the reels, is a modified vacuum chamber buffer. This buffer is a vacuum chamber having converging sides instead of parallel sides. When tape is withdrawn from the chamber, a greater area of the stored loop is exposed to the vacuum and greater tension is supplied to the tape path. Accordingly, the reels are caused to accelerate immediately after the capstan begins to move tape, and with a greater acceleration than heretofore. The modified vacuum chamber is generally more expensive than a simple buffer arm, but, since no movement of the mass of an arm occurs, it allows for more rapid acceleration.

When the tape transport is energized but no tape movement is occurring, the reel motors supply a torque to maintain tension in the tape path and maintain tape storage in the buffers. During the operation of tape transports, the radius of tape on the reels varies, the reel motors may become hot, or line voltage may vary, resulting in variations in the reel-motor-supplied tape tension, and thus, the amount of tape stored by the buffer. In accordance with one feature of the invention, two or more levels of reel motor energization are employed to compensate for the above-mentioned variations, to enable the reel to supply nearly constant tape tension and therefore to provide constant tape storage. Alternatively, the level of spring bias of the buffer arm, or the amount of vacuum of a vacuum chamber buffer may be changed to provide for constant tape storage. The variations in energization of the reel motor, the bias of the buffer arm, or the amount of vacuum may be made unresponsive to very rapid changes in amount of tape storage in the buffers, so that variations in energization cannot occur at the natural frequency of oscillation of the system.

A better understanding of the invention may be had by reference to the following detailed description, taken in conjunction with the accompanying drawings in which.

Figure 1:
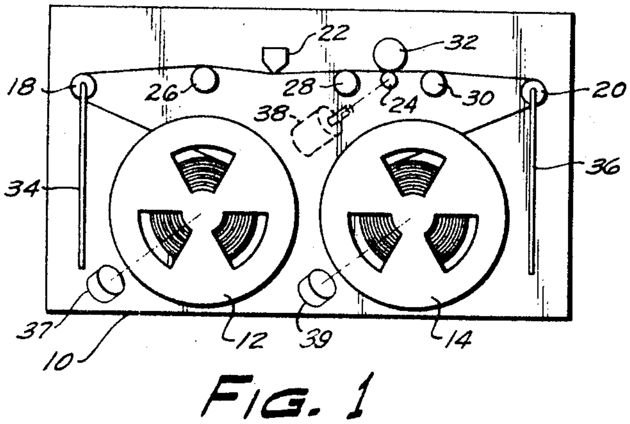
FIG. 1 is a simplified elevation view in representation of one embodiment of a tape transport constructed in accordance with the invention.

A typical tape transport which may employ the drive and buffer assembly of the present invention to advantage, is illustrated in FIG. 1 as to its general arrangement. The transport includes a tape deck 10, including a file reel 12 and take-up reel 14 between which is moved magnetic recording tape 16. The tape 16 moves along a path defined by two buffer rollers 18 and 20, past a read-write head 22 for enabling data transfer to and from the tape, and across a capstan 24 for moving the tape past the read-write head. Tape guide 26 guides the tape between the buffer roller 18 and the head 22, and a pair of guides 28 and 30 lying on either side of the capstan guide the tape onto the capstan for tape movement in either direction.

The buffer rollers 18 and 20 are attached to the ends of buffer arms 34 and 36 which are spring biased away from the head 22. When the tape 16 is stationary and a start command is received, the capstan 24 begins to rotate and move the tape, at approximately the same time as the reels 12 and 14 begin to rotate to supply and take up tape. However, the large moment of inertia of the reels delays their attainment of full speed, and more tape is moved past the capstan and head 22 than is supplied and taken up by the reels; this difference is supplied by movement of the buffer arms 34 and 36 to decrease or increase the length of tape path between the capstan and each reel.

The tape 16 is held against the capstan 24 by a pressure roller 32. In accordance with the invention the roller 32 is constantly biased against the capstan during periods when the tape is stopped as well as during movement of the tape. Acceleration, deceleration, and constant speed movement of the tape in either direction past the head 22 is accomplished by closely controlled rotation of the capstan 24. Generally, the capstan 24 is fixed to the shaft of a low armature-inertia motor 38 which is energized by a closely controlled power supply. However, other capstan driving means such as clutch means for connecting the capstan to a rotating wheel or other constant speed drive means may be used, provided however, that tape movement is accomplished by changing capstan rotation rather than by controlling engagement of the tape with the capstan. Reel motors 37, 39 are provided to turn the reels 12, 14.

Figure 2:
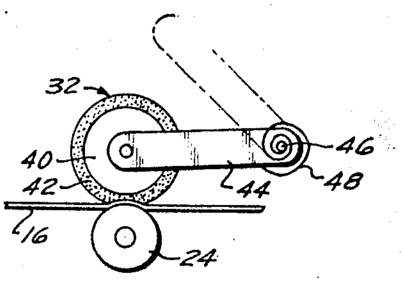
FIG. 2 is a simplified partial view of the capstan and pressure roller assembly of FIG. 1.

A more detailed illustration of the capstan 24 and pressure roller 32 is given by FIG. 2. The capstan is constructed of steel and has a smooth, hard surface which is accurately formed in a cylindrical shape. The pressure roller 32 has an inner cylinder 40 of steel and an outer sleeve 42 of rubber or other nominally elastic material. A roller arm 44 pivotally mounted at 46 to the top plate enables movement of the roller 32 away from the capstan 24, to enable the loading and unloading of tape 16 between roller and capstan. A spiral spring indicated at 48 biases the roller 32 against the capstan.

The pressure roller 32 must press against the tape and capstan with sufficient force to provide a tape-to-capstan friction driving force which overcomes any tape tension differential to be encountered. Such tension differential is caused by friction in the tape path and by the forces required to overcome the inertia of buffer elements that must be moved, or of the tape reels in those cases where no buffer is used. Tension differentials are also caused by differences in the radius of the tape supplies on the file and take-up reels, where the torque of the two reel motors are the same. The capstan drive power must be sufficient to overcome this tape tension differential, and also to overcome the inertia of the pressure roller. In those cases where the pressure roller surface is deformable, as is the case where a rubber sleeve is employed, an additional capstan driving force must be supplied to overcome resistance to continual deformation of the roller during rotation. The depression of the roller, while requiring more driving power, serves a useful purpose in braking the capstan when a stop command is received, and in preventing capstan rotation and tape movement when the transport is deenergized. Although brush friction of the capstan motor helps prevent tape movement, such friction is too small to prevent creep in the presence of appreciable tape tension differential, and the additional braking action of the roller is also necessary.

In situations where large tape tension differential is likely to be encountered, the force of the pressure roller against the capstan must be large to prevent tape slippage during acceleration. Also, where greater tape tension differential is encountered, increased braking must be supplied to prevent capstan creep. Where a deformable roller is used, increasing the roller pressure on the capstan not only increases tape-to-capstan friction, but also increases the braking force of the roller to prevent creep. Thus, greater driving force and greater braking are achieved simultaneously with inceased bias force of a deformable roller.

Figure 3:
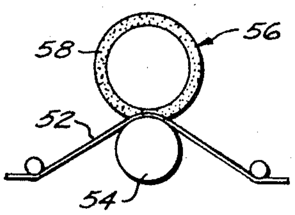
FIG. 3 is a simplified partial view of a capstan and pressure roller assembly wherein the tape is wrapped slightly about the capstan.

While the straight line tape path shown in FIG. 2 enables facile tape threading, advantages are obtained by providing a slight tape wrap about the capstan, as shown in FIG. 3. In the figure, the tape 52 is wrapped approximately 30° about the capstan 54. The capstan is constructed of metal and can be maintained in a precise cylindrical shape, while the pressure roller 56 has an outer rubber sleeve 58 and cannot be maintained in a precise shape. By wrapping the tatpe about the capstan along those areas where the roller contacts the tape, the tape is made to conform to the capstan and is guided accurately. As a result, skew of tape is held to a minimum. Tape wrap can be increased, but when it is more than about 90°, the tape path is not simple and one advantage of the clamped capstan drive is lost.

Figure 4:
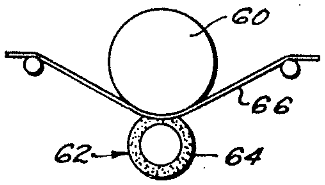
FIG. 4 is a simplified partial view of a capstan and pressure roller assembly wherein the tape is wrapped slightly about the roller.

FIG. 4 illustrates a construction wherein a rigid roller 60 of steel or the like, is used in conjunction with a capstan 62 having a covering sleeve 64 of elastic material such as rubber. In this case, the tape path provides for a slight wrap of tape 66 about the roller 60 to enable accurate tape guidance.

For a given tape tension differential and capstan driving characteristics, there are optimum capstan and roller diameters for producing maximum tape acceleration. However, the use of such optimum diameters results in varying lengths of tape travel in starting or stopping when tape tension varies. It is generally necessary to leave inter-record gaps on the tape equal to the longest length of tape travel which may be encountered. As mentioned previously, these inter-record gaps waste tape and should be kept uniformly small. One method of reducing variations in tape travel is to use a capstan drive system which provides a constant torque during start or stop, together with a capstan diameter which is much smaller than the optimum value.

The use of a capstan of much smaller diameter than optimum results in the tape tension differential constituting a small proportion of the motor load, so that variations in tape tension have an insignificant effect on acceleration. The torque of the motor must overcome two major loads. One load is the inertia and friction of the armature, capstan, and tachometer. The other load is that driven by the capstan, which includes the tape tension differential, pressure roller inertia and friction, and tape path friction. If the capstan diameter is very large, most of the motor torque will be used to drive the tape and pressure roller load, and the tape will accelerate rapidly for moderate motor acceleration; however, the load on the motor will be so great that the motor will not accelerate rapidly and the resulting acceleration of tape will not be high. If the capstan diameter is very small, the motor can accelerate rapidly, but with a small capstan the acceleration of the tape will be small, regardless.

For a given system, there is a certain capstan diameter which results in maximum tape acceleration (between zero and a given speed). This optimum diameter may be thought of as that diameter wherein the torque during acceleration due to the motor armature, tachometer, and capstan is equal to the torque on the motor shaft due to the tape tension differential, pressure roller, and tape friction load. This phenomenon is well known in electrical and acoustical arts where matching of impedances is required to realize maximum power transfer. In the present case, some loads vary with speed, but the optimum capstan diameter for mechanical "impedance matching" can be calculated for the case of obtaining maximum constant acceleration or maximum average acceleration between zero and a given speed. Alternatively, various sizes of capstans can be tried and that diameter which yields the maximum tape acceleration is the optimum.

When a capstan diameter much less than optimum is used, the motor load due to tension differential is reduced. Accordingly, even for wide variations in tape tension differentials, the motor acceleration and tape acceleration will remain constant. Generally, a capstan diameter one-half of optimum will significantly reduce the effect of tension variations, while a diameter one-fifth of optimum will reduce the effect of tension variations to a negligible amount.

Figure 5:
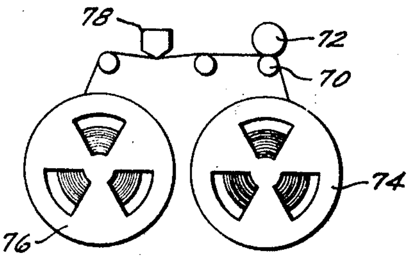
FIG. 5 is a simplified view of a tape transport constructed in accordance with the invention wherein no buffer is employed along the tape path.

Various types of tape transports can employ the clamped-tape direct capstan drive feature of the present invention, particularly the simpler types of transports. FIG. 5 illustrates the general organization of a tape transport which runs the tape between the reels without the use of a buffer to isolate the reels from the start and stop acceleration of the capstan drive. Such a system can be used where fast start and stop of the tape is not required. Moderate tape acceleration with such a system can be accomplished by coordinating reel and capstan drive so that the capstan does not move tape faster than the reels take up and release tape during start and stop. In the configuration of FIG. 5, the capstan 70 and its pressure roller 72 are located adjacent to the take-up reel 74. In this configuration the best tape guiding occurs when tape is run from the supply reel 76 to the take-up reel 74, inasmuch as the capstan 70 then supplies an accurately controlled tension along the portion of the tape path passing by the head 78.

Figure 6:
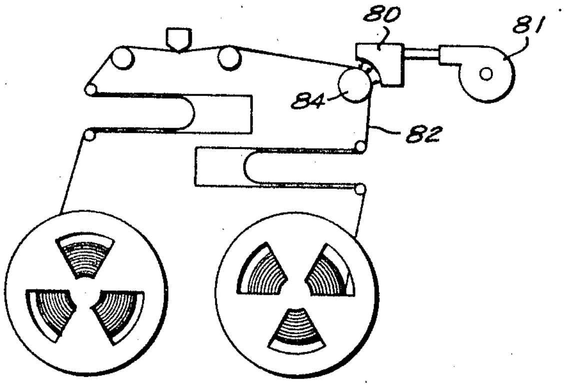
FIG. 6 is a simplified elevation view of a transport wherein pressured air is used to press tape against the capstan.

While a pressure roller may be used to hold the tape against the capstan, other means may be employed instead. For example, FIG. 6 shows an air nozzle 80 which blows pressured air from a pump 81 against the tape 82 to hold it against the capstan 84. This configuration, like the others described herein, provides for relatively simple tape threading and operates with relatively large tape tension differentials; in addition it eliminates the inertia of a pressure roller. However, it possesses many of the disadvantages of systems which rely only on large capstan wrap. One disadvantage is that if the pump or air compressor 81 is deenergized and air no longer issues from the nozzle 80, tape position is lost. Additionally, extra expense is involved in providing an air pump and air nozzles, although systems which use vacuum chamber buffers can often be adapted to supply pressured air from the same source which supplies the vacuum.

It should be understood that various changes in the details which have been herein described and illustrated in order to explain the nature of the invention, may be made by those skilled in the art, within the principles and scope of the invention as expressed in the appended claims.

I claim:

1. A tape transport comprising:
a supply reel;
a take-up reel;
motor means for rotating said reels;
a capstan for moving magnetic tape between said reels;
an electrically energizable motor having an electrical imput for receiving energization currents and having a low inertia armature directly coupled to said capstan, for rapidly accelerating and decelerating said capstan in accordance with acceleration and deceleration of said armature;
roller means; and
means for continually biasing said roller means toward said capstan independently of tape movement.

2. The tape transport described in claim 1 wherein:
said capstan is fixed to the same shaft on which said motor armature is mounted.

3. A tape transport comprising:
a supply reel;
a take-up reel;
a capstan;
a roller with a deformable surface;
means for continually pressing said roller toward said capstan independently of tape movement;

reel motor means for rotating said supply and take-up reels;
a motor having an armature coupled to said capstan to accelerate and decelerate said capstan in accordance with the acceleration and deceleration of said motor armature; and
buffer means positioned between said capstan and each of said reels to permit more rapid acceleration and deceleration of tape by said capstan than by said reels.

References Cited

UNITED STATES PATENTS

| | | | |
|---|---|---|---|
| 3,185,364 | 5/1965 | Kleist | 226—24 |
| 2,527,145 | 10/1950 | Mitchell | 179—6 |
| 2,976,372 | 3/1961 | Sampson | 179—100.2 |
| 3,142,429 | 7/1964 | Zivny | 226—187 |
| 3,224,008 | 12/1965 | Hawley | 346—74 |
| 2,676,212 | 4/1954 | Williams | 242—55.12 X |
| 2,683,568 | 7/1954 | Lindsay | 242—55.12 |

LEONARD D. CHRISTIAN, Primary Examiner

U.S. Cl. X.R.

242—202